(12) United States Patent
Field

(10) Patent No.: US 10,881,985 B1
(45) Date of Patent: Jan. 5, 2021

(54) SYSTEM WITH REUSABLE COLUMN WITH RESIN PACKING AND UNPACKING PROCEDURES AND SAMPLE ANALYSIS

(71) Applicant: Elemental Scientific, Inc., Omaha, NE (US)

(72) Inventor: Michael Paul Field, Papillion, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 325 days.

(21) Appl. No.: 15/836,305

(22) Filed: Dec. 8, 2017

Related U.S. Application Data

(60) Provisional application No. 62/431,731, filed on Dec. 8, 2016.

(51) Int. Cl.
*B01D 15/20* (2006.01)
*B01D 15/14* (2006.01)
(Continued)

(52) U.S. Cl.
CPC .......... *B01D 15/206* (2013.01); *B01D 15/14* (2013.01); *B01D 15/18* (2013.01); *G01N 30/40* (2013.01); *G01N 30/56* (2013.01); *B01D 15/1885* (2013.01); *B01D 2221/10* (2013.01); *G01N 30/6043* (2013.01); *G01N 30/8658* (2013.01);
(Continued)

(58) Field of Classification Search
CPC ...... B01D 15/10; B01D 15/16; B01D 15/166; B01D 15/20; B01D 15/206; B01D 15/203; B01D 15/22; B01D 15/1807; B01D 15/18; B01D 15/14; B01D 15/1864; B01D 15/1871; B01D 15/1885; B01D 15/1878; G01N 30/02; G01N 30/50; G01N 30/56; G01N 30/58; G01N 30/60; G01N 30/6043; G01N 30/6034; G01N 30/6039; G01N 30/86; G01N 30/8658; G01N 30/38; G01N 30/40; G01N 30/42; G01N 30/28;
(Continued)

(56) References Cited

U.S. PATENT DOCUMENTS 3,847,550 A * 11/1974 Scott .................... G01N 30/467
436/161
4,631,687 A * 12/1986 Kowalski ............... G01N 21/31
702/28

(Continued)

FOREIGN PATENT DOCUMENTS

WO WO-2012006754 A1 * 1/2012 ........... B01D 15/206

OTHER PUBLICATIONS

CHT Ceramic Hydroxyapatite. Available at <https://www.bio-rad.com/webroot/web/pdf/lsr/literature/LIT611E.PDF>, dated Sep. 5, 2015 via <http://www.archive.org>, 43 pages. (Year: 2015).*

Primary Examiner — Katherine Zalasky McDonald
(74) Attorney, Agent, or Firm — Kevin E. West; Advent, LLP

(57) ABSTRACT

Systems and methods for automatically packing resin into and unpacking resin from a reusable separation column for sample analysis are described. A method embodiment includes, but is not limited to, introducing a slurry of resin to a reusable sample separation column to pack the reusable column with resin; introducing a sample solution to the reusable sample separation column; and unpacking the resin from the reusable sample separation column with a flow of liquid unpacking reagent and gaseous material.

19 Claims, 8 Drawing Sheets

(51) Int. Cl.
*G01N 30/56* (2006.01)
*G01N 30/40* (2006.01)
*B01D 15/18* (2006.01)
*G01N 30/60* (2006.01)
*G01N 30/38* (2006.01)
*G01N 30/86* (2006.01)

(52) U.S. Cl.
CPC . *G01N 2030/387* (2013.01); *G01N 2030/402* (2013.01); *G01N 2030/565* (2013.01)

(58) Field of Classification Search
CPC ............. G01N 30/34; G01N 2030/562; G01N 2030/565; G01N 2030/387; G01N 2030/402
See application file for complete search history.

(56) References Cited

U.S. PATENT DOCUMENTS

| | | | | |
|---|---|---|---|---|
| 5,213,683 A | * | 5/1993 | Mann | B01D 15/206 210/189 |
| 6,740,241 B1 | * | 5/2004 | Dickson | B01D 15/08 141/12 |
| 6,812,030 B2 | * | 11/2004 | Ozbal | B01F 5/0085 210/656 |
| 6,911,151 B1 | * | 6/2005 | Muller-Kuhrt | B01D 15/1885 210/103 |
| 2003/0089662 A1 | * | 5/2003 | Hofmann | B01D 15/206 210/656 |
| 2007/0090035 A1 | * | 4/2007 | Rahn | G01N 30/6021 210/198.2 |
| 2007/0193933 A1 | * | 8/2007 | Vidalinc | B01D 15/206 210/198.2 |
| 2008/0247914 A1 | * | 10/2008 | Edens | G01N 35/0099 422/400 |
| 2008/0264837 A1 | * | 10/2008 | Agee | G01N 30/56 209/629 |
| 2009/0294378 A1 | * | 12/2009 | Degiacomo | A01K 63/047 210/744 |
| 2010/0044323 A1 | * | 2/2010 | Asplund | B01F 7/22 210/773 |
| 2011/0073213 A1 | * | 3/2011 | Edblad | G01N 30/56 141/1 |
| 2011/0120951 A1 | * | 5/2011 | Hampton | G01N 30/56 210/657 |
| 2011/0139689 A1 | * | 6/2011 | Snyder | B01D 15/22 210/95 |
| 2013/0068671 A1 | * | 3/2013 | Gebauer | G01N 30/466 210/85 |
| 2013/0107658 A1 | * | 5/2013 | Worley | B01F 5/10 366/137 |
| 2013/0228501 A1 | * | 9/2013 | Lefebvre | B01D 15/206 210/198.2 |
| 2014/0224738 A1 | * | 8/2014 | Gebauer | B01D 15/206 210/656 |
| 2015/0360145 A1 | * | 12/2015 | Hofmann | G01N 30/56 210/656 |
| 2016/0228790 A1 | * | 8/2016 | Bjorling | B01D 15/206 |
| 2019/0270034 A1 | * | 9/2019 | Ward | G01N 30/606 |

\* cited by examiner

SYSTEM WITH REUSABLE COLUMN WITH RESIN PACKING AND UNPACKING PROCEDURES AND SAMPLE ANALYSIS

CROSS-REFERENCE TO RELATED APPLICATIONS

The present application claims the benefit of 35 U.S.C. § 119(e) of U.S. Provisional Application Ser. No. 62/431,731, filed Dec. 8, 2016, and titled "SYSTEM WITH REUSABLE COLUMN WITH RESIN PACKING AND UNPACKING PROCEDURES AND SAMPLE ANALYSIS." U.S. Provisional Application Ser. No. 62/431,731 is herein incorporated by reference in its entirety.

SUMMARY

Systems and methods for automatically packing resin into and unpacking resin from a reusable separation column for sample analysis are described. A method embodiment includes, but is not limited to, introducing a slurry of resin to a reusable sample separation column to pack the reusable column with resin; introducing a sample solution to the reusable sample separation column; and unpacking the resin from the reusable sample separation column with a flow of liquid unpacking reagent and gaseous material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. In the figures, the use of the same reference numbers in different instances in the description and the figures may indicate similar or identical items.

DETAILED DESCRIPTION

Figure 1:
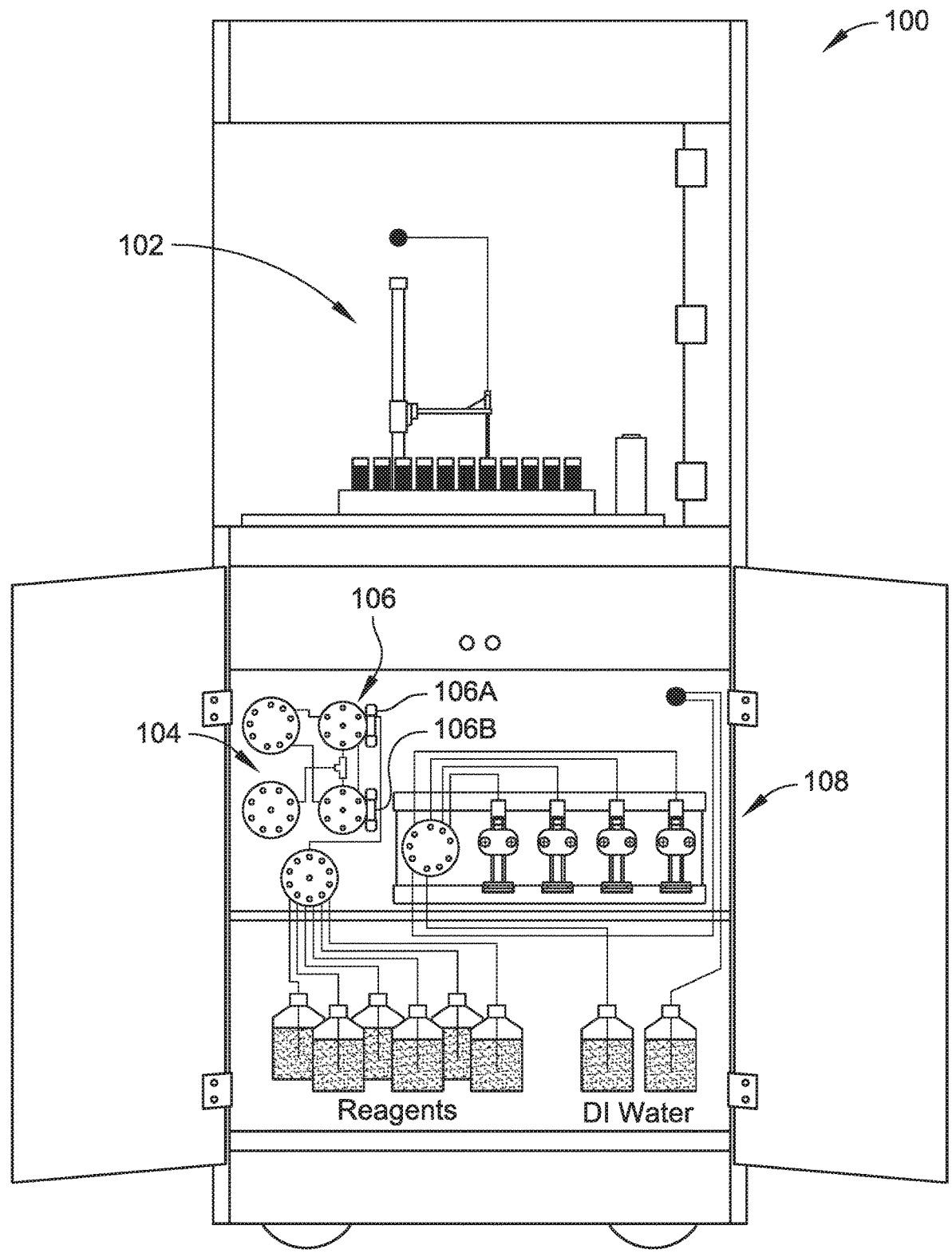
FIG. 1 is a schematic illustration of a system for automatically packing resin into and unpacking resin from a reusable separation column for sample analysis in accordance with example implementations of the present disclosure.

Referring to FIGS. 1-8, example implementations of automatically packing resin into and unpacking resin from a reusable separation column for sample analysis are described. Sample separation columns are utilized in analytic systems to separate various components from each other on a time basis. The columns can include one or more resins within a flow path through the column to interact with the sample and induce the separation, such as through chemical interactions between the resin and one or more sample components, through influencing flow characteristics through the column, or the like, or combinations thereof. When a column processes a sample, the resin contained therein can be contaminated with one or more components of the processed sample. Such contamination of the resin can jeopardize the accuracy of processing additional samples due to a risk of contamination of the additional samples, such as due to interaction or contact between the additional samples and previously-used resin. To mitigate such risks, the used sample separation column can be replaced with a new, unused column. However, replacement of columns can increase the costs associated with processing samples, can create waste, can create potential environmental risks for disposal, and the like. Moreover, attempting to remove used resin from a column and replacing with unused resin can introduce additional complications including, but not limited to, ensuring complete removal of the used resin (e.g., particularly where microscale or nanoscale resin particles are used), avoiding waste associated with filling a column with resin (e.g., wasting resin by overfilling a column), avoiding incomplete filling of a column with resin (e.g., having insufficient resin to provide the necessary separation environment within the column), or the like.

Accordingly, the present disclosure is directed to systems and methods for automatically packing resin into and unpacking resin from a reusable separation column. The column unpacking is facilitated by a flow of liquid unpacking reagent and gaseous material (e.g., Argon) providing a turbulent environment within the reusable separation column to completely remove the used resin located therein. The complete removal of the used resin and subsequent repacking of the column with fresh resin provides a convenient and efficient system for analytical tests of various samples including, but not limited to, radioisotopes (e.g., for high precision isotope analysis for nuclear forensics, food authentication, or the like). In implementations, the resin is introduced to and removed from each reusable separation column from the same side of the column. Each reusable column can include a frit on one side to prevent the passage of resin while permitting passage of fluids, such as the fluid of the resin slurry, and can include an open end with no frit (e.g., the resin loading and unloading side) to permit passage of the resin slurry. In an implementation, the system includes an optical sensor positioned adjacent a reusable column to measure a level of resin within the column, such as during a loading/packing procedure. The pumping of the resin slurry can be controlled by an output of the optical sensor indicative of a resin level within the column, such as to prevent overfill of the column. In implementations, systems and methods are described using multiple reusable separation columns, such as to permit multiple stages of sample separation, such as by including differing resin types in the columns, differing amounts of resin in the columns, or the like. Each of multiple reusable separation columns can be automatically packed and unpacked.

In the following discussion, example implementations of techniques for providing automatic packing resin into and unpacking resin from a reusable separation column for sample analysis are presented.

Example Implementations

FIG. 1 illustrates a system 100 for providing automatic packing of resin into and unpacking of resin from a reusable separation column for sample analysis in an example implementation. As shown, the system 100 generally includes a sampling device 102 (e.g., autosampler), a valve system 104, one or more reusable separation columns 106 (a first column 106a and a second column 106b are shown), and a pump system 108 having one or more syringe pumps to introduce fluids (e.g., samples, diluents, eluents, resin slurries, column packing fluids, column unpacking fluids, etc.). The valve system 104 includes a plurality of valves (e.g., rotary valves) switchable between multiple configurations to provide differing flow paths through the system 100, dependent on the valve configuration. The reusable separation columns can be independently accessed from one another, provided in a same flow path to introduce a fluid to each column, or combinations thereof. Following separation of a sample via one or more reusable separation columns 106, the system 100 can introduce fluid eluted from the one or more reusable separation columns 106 to an analysis device (e.g., an inductively coupled plasma mass spectrometer (ICP-MS)) coupled with the system 100 for determination of the composition of the eluted fluid.

Figure 2:
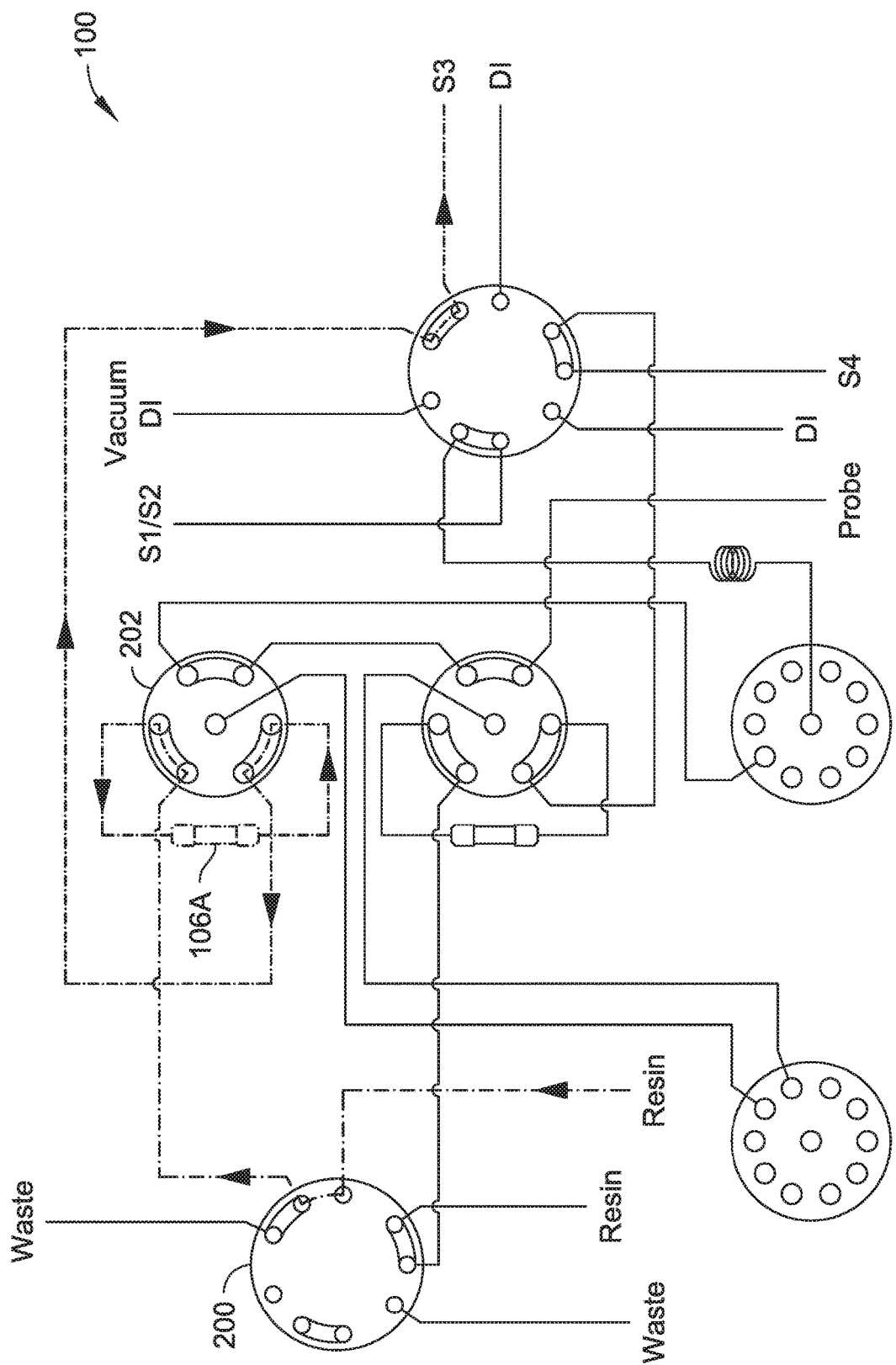
FIG. 2 is a schematic illustration of an implementation of the system of FIG. 1 in a resin packing configuration for a first sample separation column.

FIG. 2 is a schematic illustration of an implementation of the system 100 with the valve system 104 in a resin packing configuration (e.g., flow path configuration) to provide fluid communication between a resin source (e.g., resin slurry) and the first column 106a. For instance, a pump (e.g., syringe pump) of the pump system 108 can draw a resin slurry through a selector valve 200 and a first valve 202 coupled with the first column 106a. In an implementation, the column is automatically packed based on a flow rate of a pump supplying the resin slurry, a density of the slurry, and a volume of the column. For example, for a 10% resin slurry solution and a 1 mL column, 10 mL of resin slurry could be introduced to the column to fill the column with resin. In implementations, the system 100 includes an optical sensor to measure a level of resin within the column during loading/packing procedures, described further herein with reference to FIGS. 7A and 7B.

Figure 3:
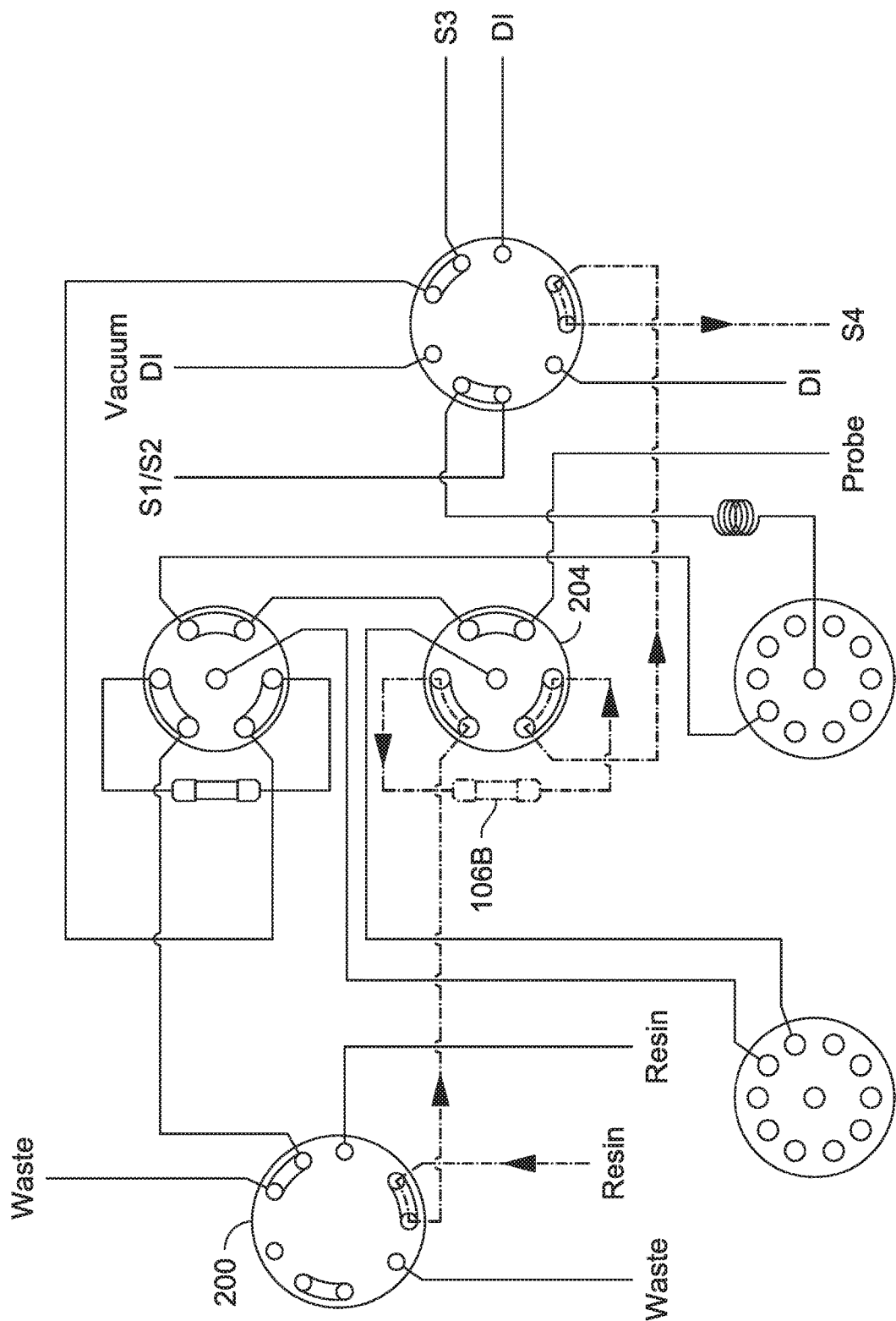
FIG. 3 is a schematic illustration of an implementation of the system of FIG. 1 in a resin packing configuration for a second sample separation column.

FIG. 3 is a schematic illustration of an implementation of the system 100 with the valve system 104 in a resin packing configuration (e.g., flow path configuration) to provide fluid communication between a resin source (e.g., resin slurry) and the second column 106b. For instance, a pump (e.g., syringe pump) of the pump system 108 can draw a resin slurry through a selector valve 200 and a second valve 204 coupled with the second column 106b. The resin slurry in fluid communication with the second valve 204 can be the same resin slurry or same type of resin that is in fluid communication with the first valve 202 during the resin packing configuration shown in FIG. 2, or can be a different resin slurry, a different slurry concentration, or the like.

Figure 4:
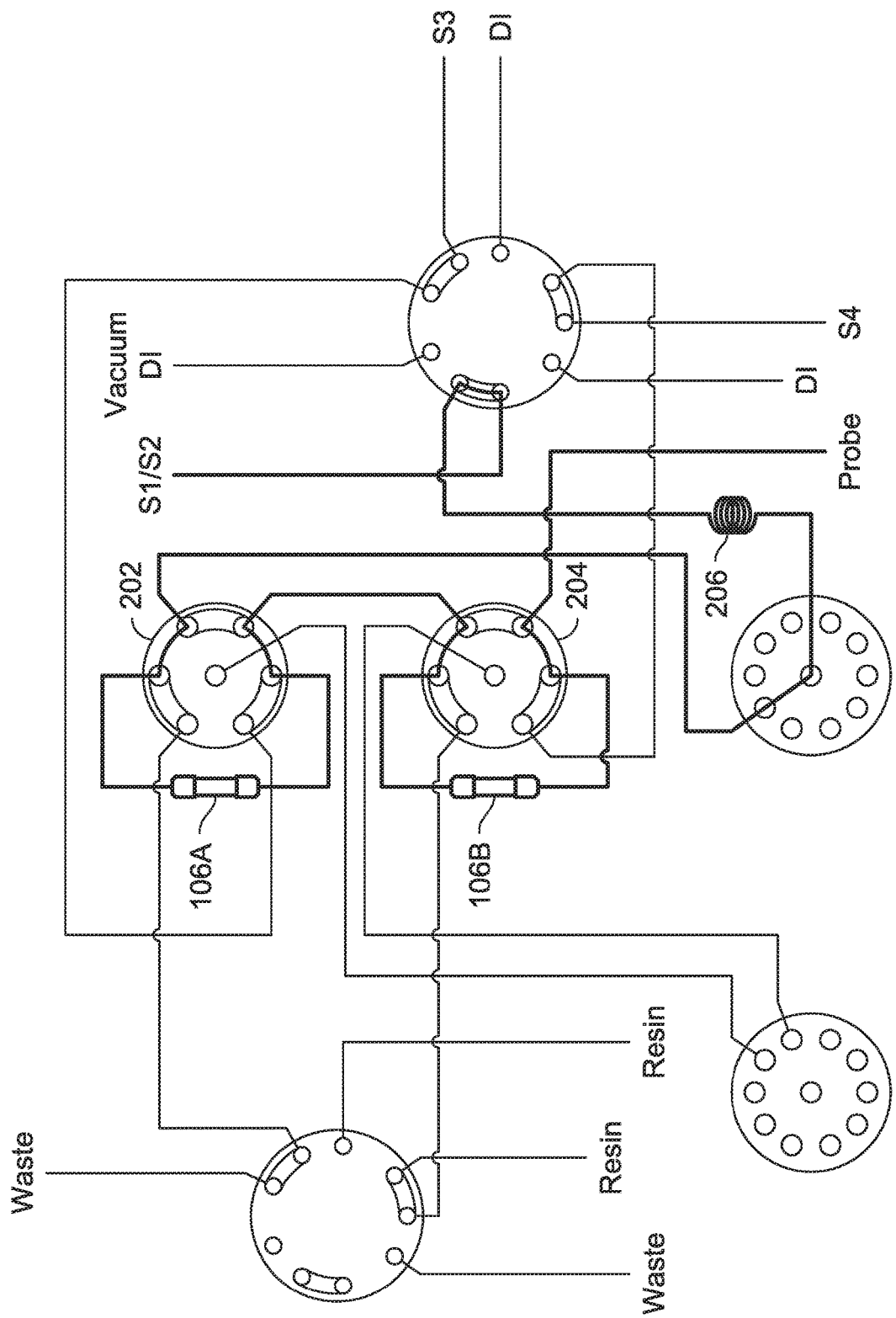
FIG. 4 is a schematic illustration of an implementation of the system of FIG. 1 in a sample load configuration to load a sample onto the first sample separation column and the second sample separation column.

FIG. 4 is a schematic illustration of an implementation of the system 100 with the valve system 104 in a sample load configuration (e.g., flow path configuration) to provide fluid communication between a sample (e.g., from the sampling device 102) to load the sample onto the first column 106a and the second column 106b. For instance, a pump (e.g., syringe pump) of the pump system 108 can introduce a sample held in a sample loop 206 (e.g., provided by a probe of the sampling device 102) through the first column 106a and the second column 106b. The sample can be subsequently eluted from the columns for analysis, such as by an ICP analysis instrument (e.g., ICP-MS).

Figure 5:
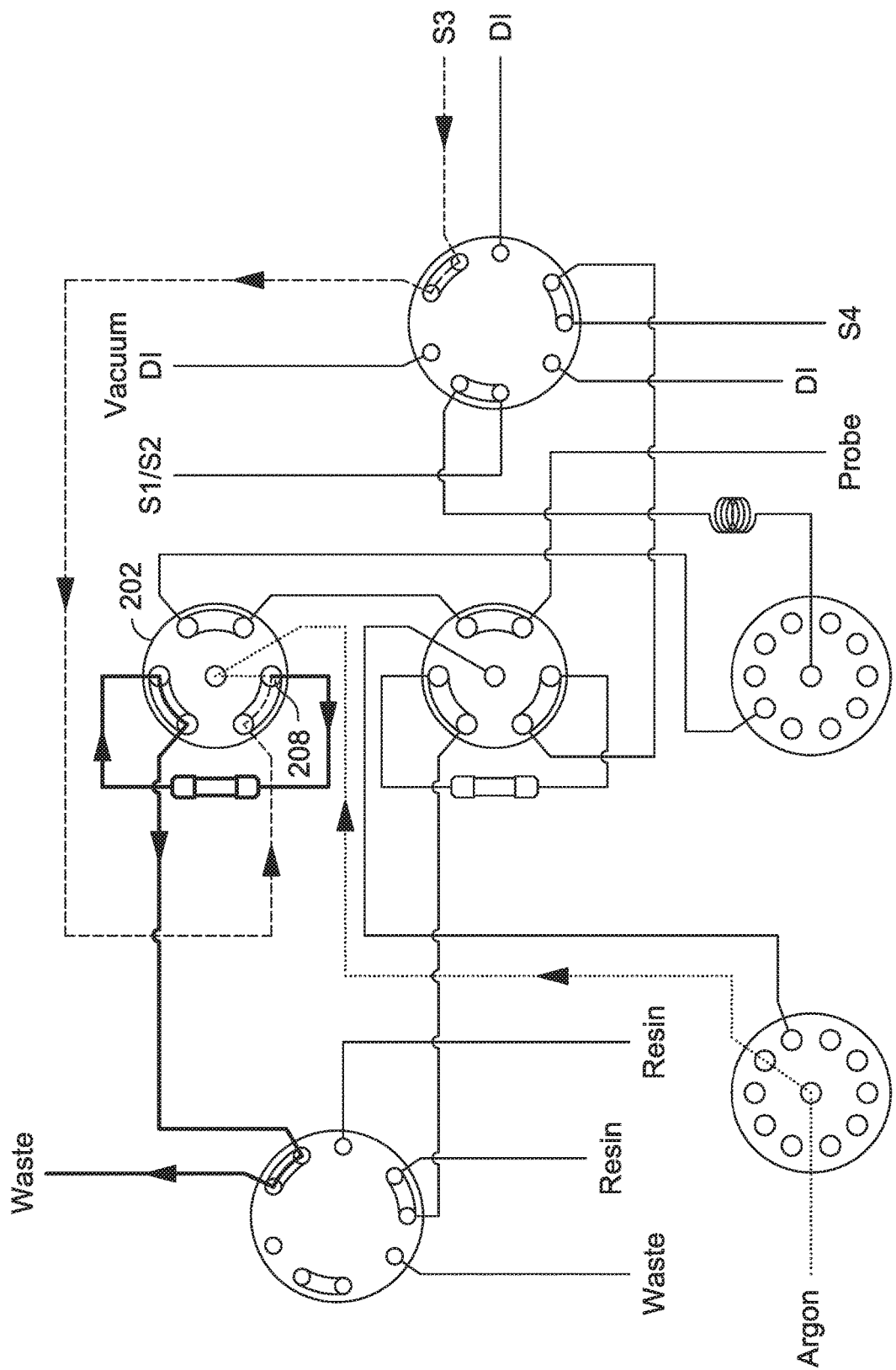
FIG. 5 is a schematic illustration of an implementation of the system of FIG. 1 in an unpacking configuration for the first sample separation column to unpack used resin from the first sample separation column.

FIG. 5 is a schematic illustration of an implementation of the system 100 with the valve system 104 in an unpacking configuration (e.g., flow path configuration) to unpack used resin from the first column 106a. For instance, a pump (e.g., syringe pump) of the pump system 108 can introduce an unpacking reagent to the first valve 202 and a gaseous material (e.g., Argon, inert gas, etc.) can be introduced to the first valve 202 to mix via a mixing port 208 with the unpacking reagent. For instance, the mixing port 208 is in fluid communication with each of the supply of gaseous material and the unpacking reagent to combine fluid streams from the gaseous material and the unpacking reagent (e.g., beginning within the first valve 202). The mixture of unpacking reagent and gaseous material is then introduced to the first column 106a on a side of the first column 106a that is opposite from the column opening through which the resin slurry was introduced in the column load configuration (e.g., shown in FIG. 2) to remove the used resin through the column opening through which the resin slurry was introduced. For example, the gaseous material can provide bubbles to the first column 106a to induce a turbulent environment within the first column 106a to remove all used resin from the first column 106a.

Figure 6:
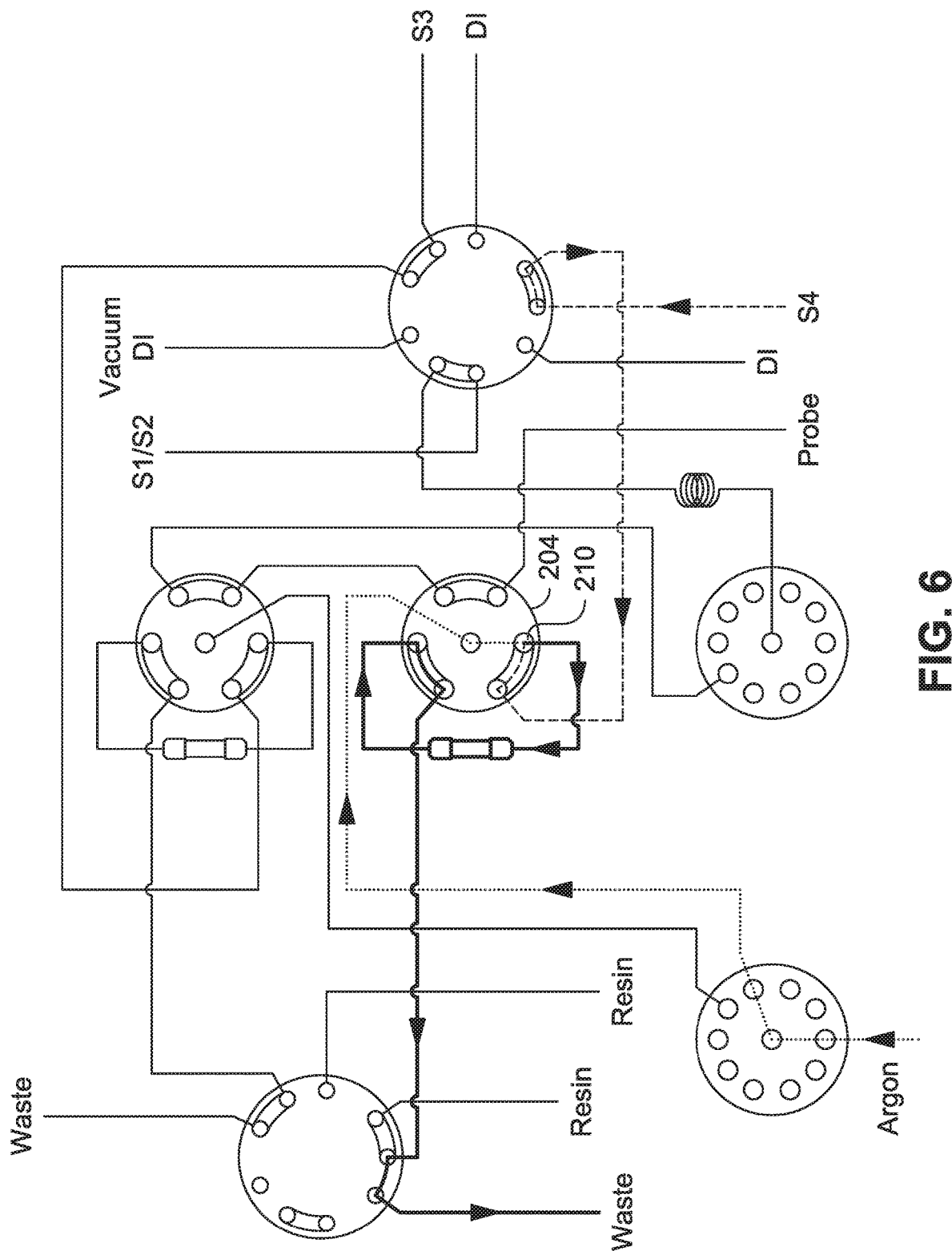
FIG. 6 is a schematic illustration of an implementation of the system of FIG. 1 in an unpacking configuration for the second sample separation column to unpack used resin from the second sample separation column.

FIG. 6 is a schematic illustration of an implementation of the system 100 with the valve system 104 in an unpacking configuration (e.g., flow path configuration) to unpack used resin from the second column 106b. For instance, a pump (e.g., syringe pump) of the pump system 108 can introduce an unpacking reagent to the second valve 204 and a gaseous material (e.g., Argon, inert gas, etc.) can be introduced to the second valve 204 to mix via a mixing port 210 with the unpacking reagent. For instance, the mixing port 210 is in fluid communication with each of the supply of gaseous material and the unpacking reagent to combine fluid streams from the gaseous material and the unpacking reagent (e.g., beginning within the second valve 204). The mixture of unpacking reagent and gaseous material is then introduced to the second column 106b on a side of the second column 106b that is opposite from the column opening through which the resin slurry was introduced in the column load configuration (e.g., shown in FIG. 3) to remove the used resin through the column opening through which the resin slurry was introduced. For example, the gaseous material can provide bubbles to the second column 106b to induce a turbulent environment within the second column 106b to remove all used resin from the second column 106b. Following unpacking, the system 100 can load fresh resin into one or more of the first column 106a (via the column load configuration of FIG. 2) or the second column 106b (via the column load configuration of FIG. 3) for additional sample analyses. The system 100 can include one or rinsing protocols between unpacking and repacking configurations to introduce a rinsing fluid through one or more fluid lines of the system 100.

Figure 7B:
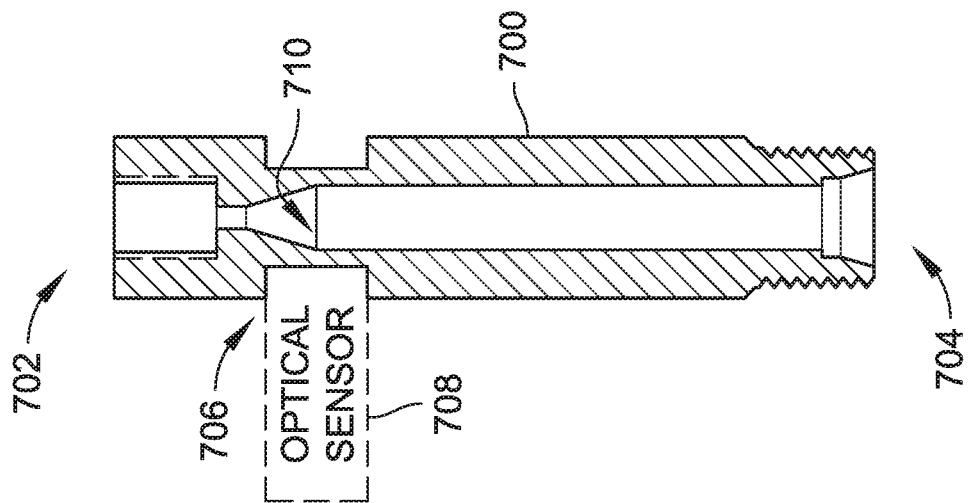
FIG. 7B is a cross-sectional view of the reusable sample separation column of FIG. 7B taken along A-A.
Figure 7A:
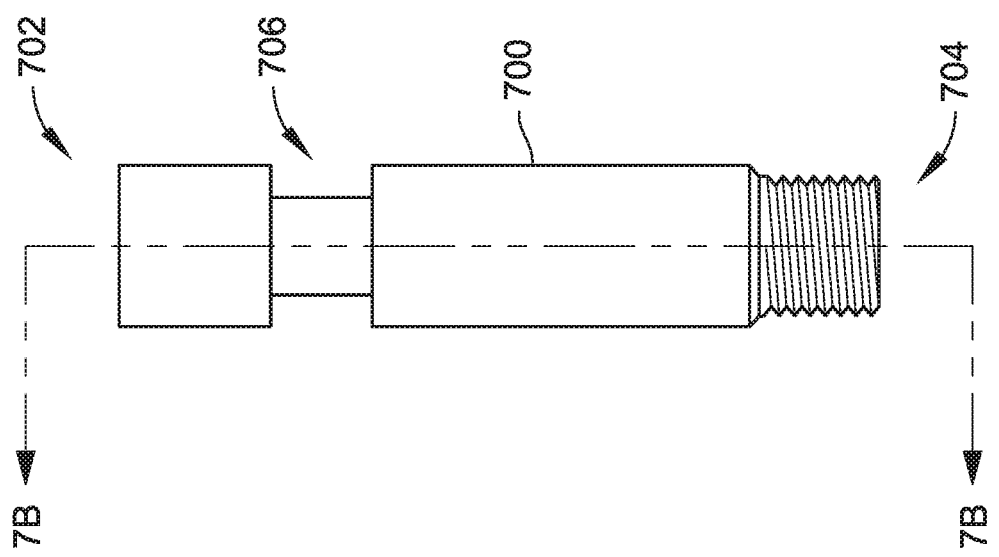
FIG. 7A is a side view of a reusable sample separation column in accordance with example implementations of the present disclosure.

Referring to FIGS. 7A and 7B, a reusable sample separation column 700 for use by the system 100 is shown in accordance with example implementations of the present disclosure. For example, the column 700 can be used as the first column 106a, the second column 106b, or combinations thereof. In an implementation, the column 700 includes a first end 702 and a second end 704 distal the first end 704. The first end 702 can couple with a fluid line (e.g., to the first valve 202 or the second valve 204) to receive the resin slurry to pack the column 700 with resin. For example, the first end 702 may not include a frit, such that the resin slurry (and the resin supported therein) can flow through the first end 702 during column packing (e.g., shown in FIG. 2 or 3), and such that the unpacking reagent, gaseous material, and used resin can flow out from the column 700 during unpacking (e.g., shown in FIG. 5 or 6). The second end 704 can include a frit to permit fluid flow, but prevent passage of any resin within the column 700. For example, during column packing (e.g., shown in FIG. 2 or 3) the resin slurry can be introduced to the first end 702 and fill the column 700, where the fluid of the resin slurry passes through the frit at the second end 704, but the resin of the resin slurry is retained within the column 700 by the frit. In an implementation, the column 700 includes a portion 706 configured to permit an optical sensor 708 optical access to an interior 710 of the column 700, such as by positioning the optical sensor 708 adjacent to the portion 706, within the portion 706, or the like, to measure a level of resin within the column 700 (e.g., at the interior 710), such as during a loading/packing procedure. The system 100 can control pumping of the resin slurry according to an output of the optical sensor 708 indicative of a resin level within the column 700, such as to cease operation of a pump of the pump system 104 (e.g., to prevent overfill of resin in the column 700). For example, during a packing procedure, the system 100 initiates a pump to introduce the resin slurry to the column 700 (e.g., during a column packing procedure shown in FIG. 2 or 3). As the resin fills the interior of 710 of the column 700, the resin level within the column will rise until the resin is within the field of view of the optical sensor 708. When the optical sensor 708 registers the resin within the field of view, the optical sensor 708 can send a signal for the system 100 to stop operation of the pump that introduces the resin slurry, to change orientation of the valve system 104 to a sample load configuration, to change orientation of the valve system 104 to fill another column 700 (e.g., transition from the column packing configuration of FIG. 2 to the column packing configuration of FIG. 3), or combinations thereof, to halt the introduction of resin slurry to the column 700.

Figure 8:
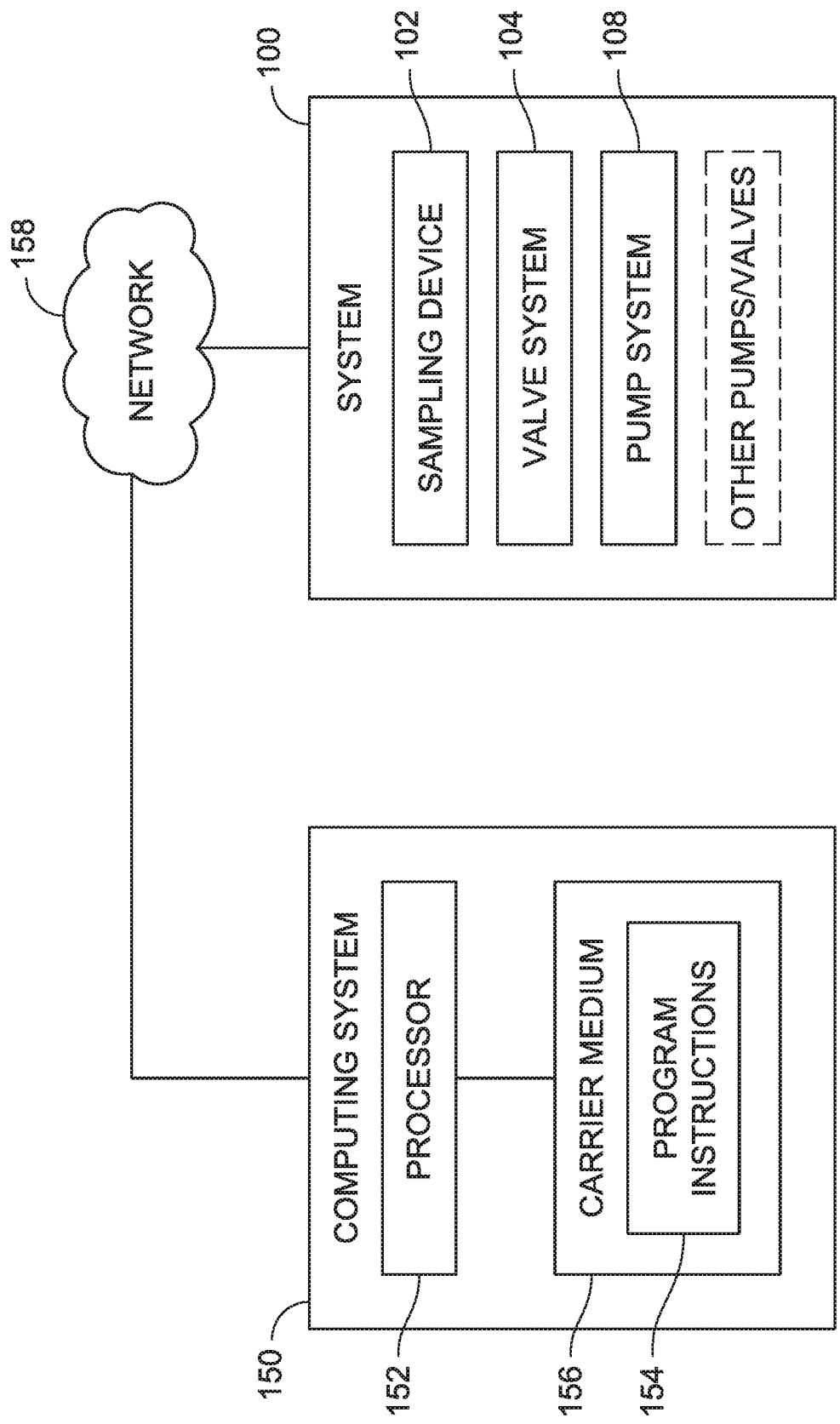
FIG. 8 is a block diagram illustrating a computing system for controlling a system for automatically packing resin into and unpacking resin from a reusable separation column for sample analysis, such as the system shown in FIG. 1.

As shown in FIG. 8, the system 100 may be controlled by a computing system 150 having a processor 152 configured to execute computer readable program instructions 154 (i.e., the control logic) from a non-transitory carrier medium 156 (e.g., storage medium such as a flash drive, hard disk drive, solid-state disk drive, SD card, optical disk, or the like). The computing system 150 can be connected to various components of the system 100, either by direct connection, or through one or more network connections 158 (e.g., local area networking (LAN), wireless area networking (WAN or WLAN), one or more hub connections (e.g., USB hubs), and so forth). For example, the computing system 150 can be communicatively coupled to the sampling device 102, the valve system 104, the pump system 108, components thereof, any of the various pumps or valves provided herein, or combinations thereof. The program instructions 154, when executing by processor 152, can cause the computing system 150 to control the system 100 (e.g., control the pumps and valves) according to one or more modes of operation (e.g., column packing, column unpacking, sample processing, etc.), as described herein. In an implementation, the program instructions 154 form at least a portion of software programs for execution by the processor 152.

The processor 152 provides processing functionality for the computing system 150 and may include any number of processors, micro-controllers, or other processing systems, and resident or external memory for storing data and other information accessed or generated by the computing system 150. The processor 152 is not limited by the materials from which it is formed or the processing mechanisms employed therein and, as such, may be implemented via semiconductor(s) and/or transistors (e.g., electronic integrated circuits (ICs)), and so forth.

The non-transitory carrier medium 156 is an example of device-readable storage media that provides storage functionality to store various data associated with the operation of the computing system 150, such as a software program, code segments, or program instructions 154, or other data to instruct the processor 152 and other elements of the computing system 150 to perform the techniques described herein. Although a single carrier medium 156 is shown in FIG. 8, a wide variety of types and combinations of memory may be employed. The carrier medium 156 may be integral with the processor, stand-alone memory, or a combination of both. The carrier medium 156 may include, for example, removable and non-removable memory elements such as RAM, ROM, Flash (e.g., SD Card, mini-SD card, micro-SD Card), magnetic, optical, USB memory devices, and so forth. In implementations of the computing system 150, the carrier medium 156 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing system 150 can include one or more displays to display information to a user of the computing system 150. In implementations, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing system 150 by touching the touch screen and/or by performing gestures on the touch screen. In some implementations, the touch screen may be a capacitive touch screen, a resistive touch screen, an infrared touch screen, combinations thereof, and the like. The computing system 150 may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing system 150 may also include a communication module representative of communication functionality to permit computing device to send/receive data between different devices (e.g., components/peripherals) and/or over the one or more networks 158. The communication module may be representative of a variety of communication components and functionality including, but not necessarily limited to: a browser; a transmitter and/or receiver; data ports; software interfaces and drivers; networking interfaces; data processing components; and so forth.

The one or more networks 158 are representative of a variety of different communication pathways and network connections which may be employed, individually or in combinations, to communicate among the components of the system 100. Thus, the one or more networks 158 may be representative of communication pathways achieved using a single network or multiple networks. Further, the one or more networks 158 are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing system 150 is described as including a user interface, which is storable in memory (e.g., the carrier medium 156) and executable by the processor 152. The user interface is representative of functionality to control the display of information and data to the user of the computing system 150 via the display. In some implementations, the display may not be integrated into the computing system 150 and may instead be connected externally using universal serial bus (USB), Ethernet, serial connections, and so forth. The user interface may provide functionality to allow the user to interact with one or more applications of the computing system 150 by providing inputs (e.g., sample identities, desired dilution factors, standard identities, eluent identities/locations, resin identities, resin slurry factors, unpacking reagent identities, etc.) via the touch screen and/or the I/O devices. For example, the user interface may cause an application programming interface (API) to be generated to expose functionality to an column packing control module to configure the application for display by the display or in combination with another display. In implementations, the API may further expose functionality to configure the column packing control module to allow the user to interact with an application by providing inputs via the touch screen and/or the I/O devices to provide desired column reagents, ratios, etc.

In implementations, the user interface may include a browser (e.g., for implementing functionality of the inline dilution control module). The browser enables the computing device to display and interact with content such as a webpage within the World Wide Web, a webpage provided by a web server in a private network, and so forth. The browser may be configured in a variety of ways. For example, the browser may be configured as an inline dilution control module accessed by the user interface. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the system 100, for example, can be wired, wireless, or some combination thereof. In the case of a software implementation, for instance, a module may represent executable instructions that perform specified tasks when executed on a processor, such as the processor 152 described herein. The program code can be stored in one or more device-readable storage media, an example of which is the non-transitory carrier medium 156 associated with the computing system 150.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A method comprising:
introducing, via pump operation, a first slurry of resin to a first end of a first reusable sample separation column coupled with a valve system to pack resin from the first slurry of resin into the first reusable sample separation column when the valve system is in a first resin packing configuration;
introducing, via pump operation, a second slurry of resin to a first end of a second reusable sample separation column coupled with the valve system to pack resin from the second slurry of resin into the second reusable sample separation column when the valve system is in a second resin packing configuration;
introducing, via pump operation, a sample solution to the first reusable sample separation column and the second reusable sample separation column when the valve system is in a sample load configuration;
mixing a gas and an unpacking reagent in the valve system;
introducing, via pump operation, the mixed gas and unpacking reagent to a second end of the first reusable sample separation column to unpack resin from the first reusable sample separation column and transfer the resin out of the first end of the first reusable sample separation column, wherein the second end of the first reusable sample separation column is distal the first end of the first reusable sample separation column; and
introducing, via pump operation, the mixed gas and unpacking reagent to a second end of the second reusable sample separation column to unpack resin from the second reusable sample separation column and transfer the resin out of the first end of the second reusable sample separation column, wherein the second end of the second reusable sample separation column is distal the first end of the second reusable sample separation column.

2. The method of claim 1, further comprising:
sensing a level of resin within the first reusable sample separation column with an optical sensor during introduction of the first slurry of resin to the first reusable sample separation column.

3. The method of claim 2, further comprising:
ceasing introduction of the first slurry of resin to the first reusable sample separation column responsive to an output from the optical sensor.

4. The method of claim 2, further comprising:
transitioning the valve system from the first resin packing configuration to the second resin packing configuration responsive to an output from the optical sensor.

5. The method of claim 2, further comprising:
transitioning the valve system from at least one of the first resin packing configuration or the second resin packing configuration to the sample load configuration responsive to an output from the optical sensor.

6. The method of claim 1, wherein mixing the gas and the unpacking reagent in the valve system includes introducing the gas and the unpacking reagent to a mixing port of a valve of the valve system.

7. The method of claim 1, wherein introducing, via pump operation, the mixed gas and unpacking reagent to the second end of the first reusable sample separation column includes inducing a turbulent environment within the first reusable sample separation column.

8. The method of claim 1, wherein the gas is an inert gas.

9. The method of claim 1, wherein the gas is argon.

10. The method of claim 1, wherein the first slurry of resin includes a same resin type as the second slurry of resin.

11. The method of claim 1, wherein the first slurry of resin differs from the second slurry of resin on the basis of at least one of resin type or resin concentration.

12. A method comprising:
introducing, via pump operation, a slurry of resin to a first end of a reusable sample separation column coupled with a valve system to pack resin from the slurry of resin into the reusable sample separation column when the valve system is in a resin packing configuration;
introducing, via pump operation, a sample solution to the reusable sample separation column when the valve system is in a sample load configuration;
mixing a gas and an unpacking reagent in the valve system; and
introducing, via pump operation, the mixed gas and unpacking reagent to a second end of the reusable sample separation column to unpack resin from the reusable sample separation column and transfer the resin out of the first end of the reusable sample separation column, wherein the second end of the reusable sample separation column is distal the first end of the reusable sample separation column.

13. The method of claim 12, further comprising:
sensing a level of resin within the reusable sample separation column with an optical sensor during introduction of the slurry of resin to the reusable sample separation column.

14. The method of claim 13, further comprising:
ceasing introduction of the slurry of resin to the reusable sample separation column responsive to an output from the optical sensor.

15. The method of claim 14, further comprising:
transitioning the valve system from the resin packing configuration to the sample load configuration responsive to an output from the optical sensor.

16. The method of claim 12, wherein mixing the gas and the unpacking reagent in the valve system includes introducing the gas and the unpacking reagent to a mixing port of a valve of the valve system.

17. The method of claim 12, wherein introducing, via pump operation, the mixed gas and unpacking reagent to the second end of the reusable sample separation column includes inducing a turbulent environment within the reusable sample separation column.

18. The method of claim 12, wherein the gas is an inert gas.

19. The method of claim 12, wherein the gas is argon.

* * * * *